April 20, 1954  W. G. GREEN  2,676,265
LIQUID LEVEL MEASURING DEVICE
Filed Jan. 26, 1953  2 Sheets-Sheet 1

INVENTOR
*Wm. G. Green*
BY
*F. D. Copeland*
AGENT

April 20, 1954  W. G. GREEN  2,676,265
LIQUID LEVEL MEASURING DEVICE
Filed Jan. 26, 1953  2 Sheets-Sheet 2

INVENTOR
WM. G. GREEN
BY
J. D. Copeland
AGENT

Patented Apr. 20, 1954

2,676,265

UNITED STATES PATENT OFFICE 2,676,265

LIQUID LEVEL MEASURING DEVICE

William G. Green, Garland, Tex., assignor to A. V. Dayton Engineering Corporation, Tulsa, Okla., a corporation of Texas Application January 26, 1953, Serial No. 333,287

8 Claims. (Cl. 250—43.5)

This invention relates to a method of and an apparatus for determining the level of a liquid and more particularly the level of a liquid in a closed container by radiation means.

The primary object of this invention is to provide a method and apparatus for determining the liquid level of a sealed tank by radiation means which will permit calibration at initial installation or for use with liquids of a different specific gravity, and will permit repair, or replacement of the radiation source without disassembly of the apparatus.

Another object of this invention is to provide a means whereby the desired calibration may be effected while the tank contains liquid under high pressure or high temperature conditions.

A further object is to provide an apparatus for attachment to the side of the tank at points above and below the desired normal liquid level range, and to provide means within the apparatus to determine the liquid level by employing a radiation source and a detector at relatively closely spaced points in vertical alignment even when used on very tall tanks.

A still further object is to provide a means for obtaining measurements of liquid level by a detector and a radiation source at closely spaced vertically aligned points even where the liquid level varies over a wide range.

Yet another object is to provide an apparatus of this type, wherein the rays used for liquid level detection are only required to pass through nominal size walls even though the main body of the tank itself has extremely thick walls.

Other objects and advantages of the present invention will become apparent from the following description and with reference to the accompanying drawing in which.

Figure 1:
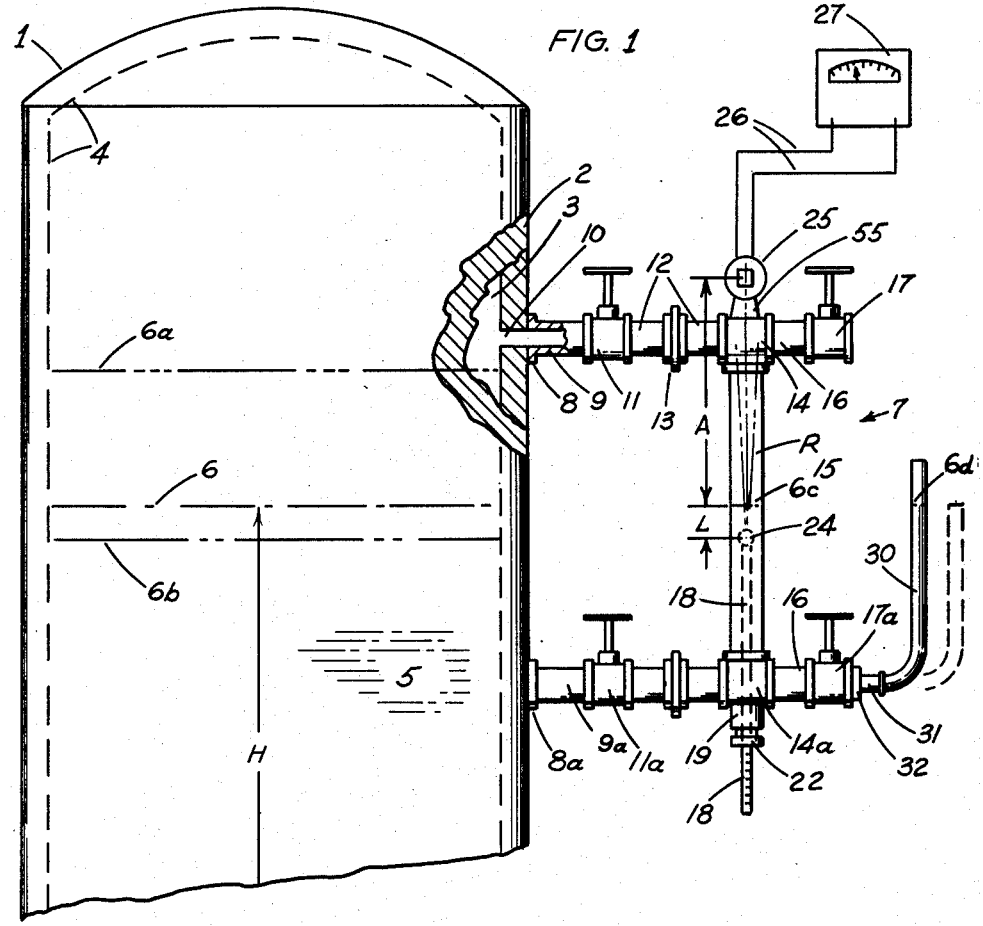
Fig. 1 is front elevational view of a tank employing the instant invention.
Figure 2:
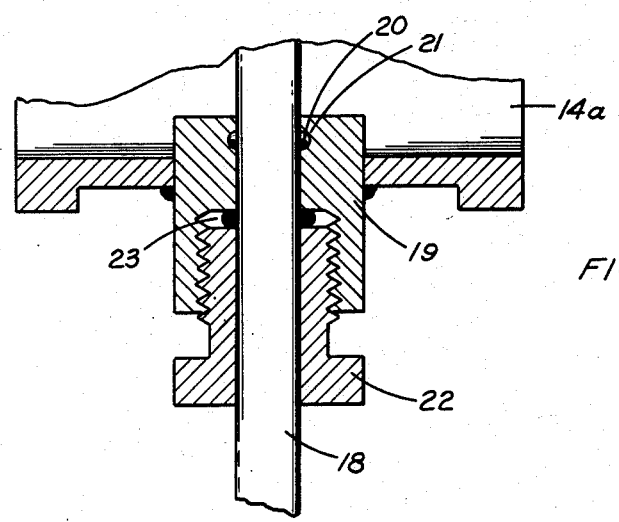
Fig. 2 is a detailed view, partly in section showing the lower T and calibration stem.

Referring now more particularly to the drawing, in Fig. 1, the sealed tank or container 1 includes thick walls 2 to withstand the high pressure and temperature of vapor 3 existing in the enclosed chamber 4 and the pressure and temperature of liquid 5 shown at its normal level 6. Liquid level indicating unit 7 is mounted to the side wall of the tank so as to approximately equally straddle the normal level 6. Flanges 8 of pipes 9 attach the latter to the side walls 2 of tank 1 in alignment with suitable openings 10 therethrough. Shut-off valves 11 are attached at one end to pipe 9 and at the other end by suitable pipe connections, such as nipples 12 and union 13 to the liquid level chamber, which in this embodiment is represented by tube 15 and T's 14 and 14a. Nipples 16 project laterally from T's 14 and are threadedly attached to bleeder valves 17 for purposes to be described in detail hereinafter. Calibration stem 18 projects through boss 19 on T 14a at the bottom of tube 15. A pressure seal 20 of the O ring type is inserted into a recess 21 of boss 19 as shown in detail in Fig. 2 to prevent leakage of liquid around stem 18. Nut 22 threadedly engages boss 19, and is tightened until O ring 23 is in firm engagement with stem 18, boss 19, and nut 22. By this arrangement stem 18 will be locked against vertical movement at whatever position nut 22 is sufficiently tightened. Calibration stem 18 includes a radiation source indicated at 24; this source may be any radio active material, but in the present embodiment radium is used. The length of the exposed end of stem 18 will indicate the vertical position of radiation source 24 within the tube 15, however calibration marks of a type that will not damage the O rings may be used if desired. At the opposite end of tube 15 and external to T 14, a detector 25 is located in substantial vertical alignment with source 24. Lead 26 electrically connects detector 25 with a remotely located direct reading indicator 27. Hose 30, shown attached to a valve 17a in Fig. 1 is only used for checking or calibration purposes as will be described hereinafter.

It has been assumed that liquid 5 stands in tank 1 at a normal level indicated at 6, but in operation the liquid level may vary between the upper and lower limits shown at 6a and 6b. With valves 11 and 11a open the liquid 5 will seek its level represented by 6c tube 15. At this point rays indicated at R will pass through a height of liquid indicated at L and a distance of air or gas indicated at A and the strength of rays R reaching detector 25 will be effected by the height L of the liquid between the source and the detector, so that an increase in the height L causes a change in the reading of indicator 27, which reading may be graduated to read directly in feet of height as indicated by H or the quantity in gallons of liquids 5 or both contained within tank 1. When the density of liquid 5 changes, as with the addition or mixing with chemicals of a different specific gravity, the effect of the liquid of L height being in the path of travel of the rays between the source and the detector is different than the effect of L of the basic liquid 5, and calibration is necessary.

Calibration is accomplished by first closing both valves 11, attaching a length of flexible hose 30 by means of its threaded fitting 31 to a bushing 32 at the free end of valve 17a and holding the hose in the position shown by solid lines in Fig. 1. Then by opening valve 17a, the liquid will seek its level from tube 15 into hose 30 as shown at 6d, and by lowering hose 30 to the position shown by dotted lines, the level in tube 15 will be equal to the height of hose 30 when the liquid just begins to overflow. This position corresponds to the height 6 in the tank within very close limits if the diameter of hose 30 is small relative to the diameter of tube 15. After this actual height is determined the calibration stem 18 is adjusted up or down until the instrument reading of indicator 27 corresponds to liquid at the actual height in the tank.

Figure 3:
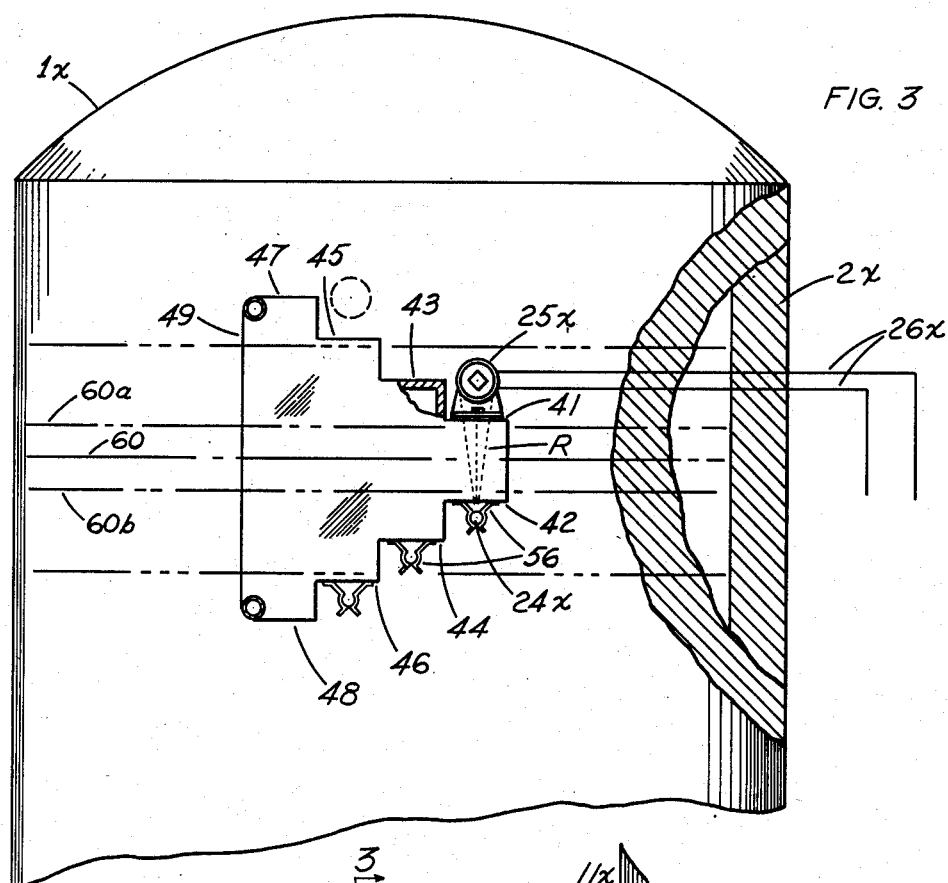
Fig. 3 is a side elevational view of another embodiment of the liquid level chamber shown in Fig. 1, partially in section taken about the lines 3—3 of Fig. 4.

The embodiment shown in Fig. 3 presents certain advantages in accuracy of reading. In installations where the liquid level varies only throughout a small range, as indicated at 60a and 60b where 60 is the normal level, the smallest step increment having top and bottom levels 41 and 42 is employed to provide the shortest path of travel available for the rays from source 24x to detector 25x. As the range of liquid level increases the detector and source may be moved to successive step levels 43, 44, 45, 46, 47, and 48. The graduated liquid level chamber 49 is fabricated from metal plate and replaces tube 15 and T's 14, and 14a, as shown in Fig. 1, otherwise in this embodiment the installation corresponds very closely to that of the first embodiment, as seen in Fig. 4.

Here however the source 24x is located externally of the tube and adjustment for specific gravity is not provided. As the range of liquid level increases to 61a and 61b limits, the detector 25x and source 24x are moved to other successive steps 45 and 46 to permit the distance between the source and the detector to be a minimum. This distance must be kept the shortest possible for extreme accuracy since the radiation intensity received at the detector varies inversely as the square of the distance. In the first embodiment it was shown that the distance between the source and the detector was just slightly greater than the range of liquid level to be measured. The same is true in this embodiment to an even greater extent since the detector and source are both moved to bracket the upper and lower limits of the liquid. The checking arrangement shown in Fig. 1 is employed in this embodiment as will be seen in Fig. 4.

Figure 4:
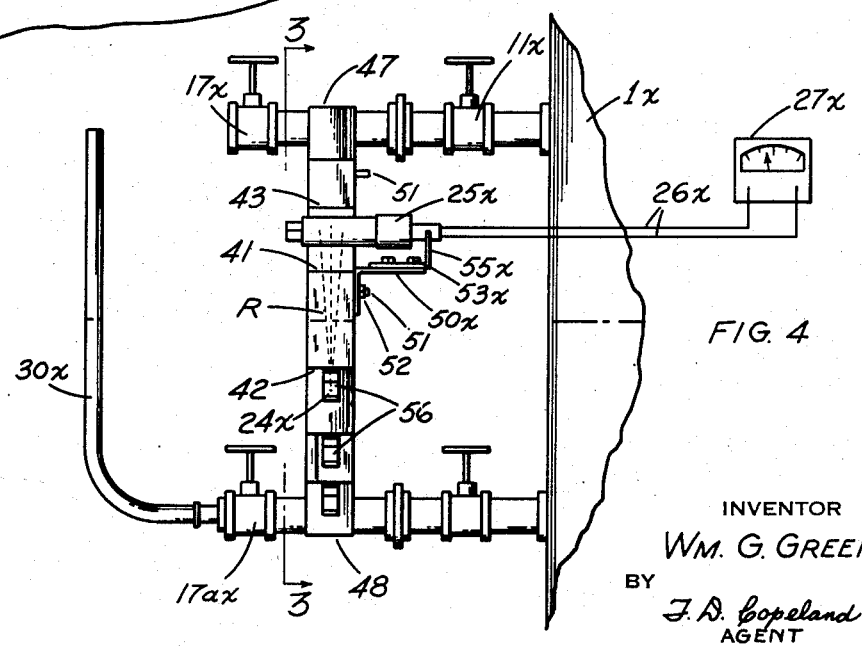
Fig. 4 is an elevational view in detail of chamber shown in Fig. 3.

Fig. 4 shows further details of the embodiment in Fig. 3. Bracket 50 is drilled to fit over studs 51 on the back side of chamber 49 near each top layer 41, 43 etc. Nuts 52 tighten over studs 51 and secure bracket 50 to chamber 49. The opposite end of bracket 50x is tapped to receive capscrews 53x which bind bracket 50x with mount 55x which is part of conventional detector unit 25x. The cylindrical radiation source 24x is inserted into snap clamps 56 which are welded to each bottom layer 42, 44, etc. This type of mounting is also used (but not fully shown) with the embodiment in Fig. 1, however in that instance bracket 50 is welded to the back of T 14.

This mounting arrangement together with clamps 56 permits the detector to be mounted directly in the path of rays R without employing any mounting structure other than the chamber itself therebetween.

It will be observed that the wall thickness of pipe 9 is very small compared to walls 2 or 2x which is advantageous in obtaining radiation readings with a minimum absorption, and yet is satisfactory to withstand bursting pressure, as the thickness for this purpose in engineering practice increases with the diameter of the container.

The calibration stem 18 of Fig. 1 may be employed with the stepped chamber 49 of Fig. 3 to provide for increased accuracy of measurement. In this arrangement, the nuts 22 would be replaced by a solid plug on the step levels other than where the measurement is actually taking place.

From the foregoing description it will be readily seen that there has been produced a device as substantially fulfills the objects of the invention as set forth herein.

While this specification sets forth in detail the present and preferred construction of this invention, still in practice such deviations from such detail may be resorted to as do not form a departure from the spirit of the invention as defined in the appended claims.

Having thus described the invention, what is claimed as new and useful and is desired to be secured by Letters Patent is:

1. A liquid level indicating apparatus comprising: a tank having openings above and below the liquid level, a liquid level chamber located externally of said tank, tubes attaching the top and bottom of said chamber to said tank in alignment with said openings whereby liquid in said tank will seek its level in said chamber, a detector located above said chamber, a radiation source located below said detector in vertical alignment therewith, rays from said radiation source passing through said liquid to said detector, and an instrument for registering the liquid level in said tank as a function of the intensity of the rays received at said detector associated with said liquid level chamber to calibrate the actual level within the chamber against the level registered on the instrument said last named means comprises a valve connected to said chamber at the top and bottom thereof, and a hose attached to said bottom connected valve to permit flow of said liquid into said hose to the level of said chamber, when said top and bottom valves are opened.

2. A liquid level indicating apparatus comprising: a tank having openings above and below the liquid level, a liquid level chamber located externally of said tank, tubes attaching the top and bottom of said chamber to said tank in alignment with said openings whereby liquid in said tank will seek its level in said chamber, a detector located above said chamber, a radiation source located below said detector in vertical alignment therewith, rays from said radiation source passing through said liquid to said detector, and an instrument for registering the liquid level in said tank as a function of the intensity of the rays received at said detector associated with said liquid level chamber to calibrate the actual level within the chamber against the level registered on the instrument said chamber including a series of stepped levels and said detector and radiation source located above and below corresponding levels selectively.

3. A liquid level indicating apparatus comprising: a tank having openings above and below the liquid level, a liquid level chamber located externally of said tank, tubes attaching the top and bottom of said chamber to said tank in alignment with said openings whereby liquid in said tank will seek its level in said chamber, a detector located externally of said chamber, a radiation source located within said chamber in vertical alignment with said detector, rays from said radiation source passing through said liquid to said detector, an instrument for registering the liquid level in said tank as a function of the intensity of the rays received at said detector, said radiation source being supported in a vertically adjustable position.

4. A liquid level indicating apparatus comprising: a tank having openings above and below the liquid level, a liquid level chamber located externally of said tank, tubes attaching the top and bottom of said chamber to said tank in alignment with said openings whereby liquid in said tank will seek its level in said chamber, a detector located above said chamber, a radiation source located below the detector in vertical alignment therewith, rays from said radiation source passing through said liquid to said detector, and an instrument for registering the liquid level in said tank as a function of the intensity of the rays received at said detector associated with said liquid level chamber to calibrate the actual level within the chamber against the level registered on the instrument said chamber including a series of stepped levels and said detector and radiation source located above and below corresponding levels selectively said radiation source being located at the top of a vertically extending calibration stem, a boss at the bottom of said chamber, and said calibration stem extending through said boss and into said chamber and means between said boss and said stem to lock said stem in an adjustable predetermined position.

5. A liquid level indicating apparatus comprising: a tank having openings above and below the liquid level, a liquid level chamber located externally of said tank, tubes attaching the top and bottom of said chamber to said tank in alignment with said openings whereby liquid in said tank will seek its level in said chamber, a detector located above said chamber, a radiation source located below said detector in vertical alignment therewith, rays from said radiation source passing through said liquid to said detector, and an instrument for registering the liquid level in said tank as a function of the intensity of the rays received at said detector associated with said liquid level chamber to calibrate the actual level within the chamber against the level registered on the instrument said chamber including a series of stepped levels and said detector and radiation source located above and below corresponding levels selectively said chamber comprising upper and lower T's, and a vertical tube therebetween, a boss at the bottom of said lower T, a calibration stem engaging said boss and extending into said tube, a radiation source at the upper end of said stem whereby moving said stem through said boss provides vertical adjustment for said radiation source, and means associated with said stem and boss to both lock and seal said stem relative to said boss.

6. A liquid level indicating apparatus comprising: a tank, liquid in said tank, said tank having openings above and below the liquid level, a liquid level chamber located externally of said tank, tubes attaching the top and bottom of said chamber to said tank in alignment with said openings whereby liquid in said tank will seek its level in said chamber, said chamber including a series of aligned upper and lower external step levels, means at each upper step level to mount a detector, means at each lower step level to mount a radiation source, and a detector mounted on an upper step level above the liquid level range and a radiation source mounted on a corresponding lower step level below the liquid level range, and an instrument connected to said detector to measure the liquid level within the tank as a function of the intensity of rays received at said detector from said radiation source.

7. A liquid level indicating apparatus as in claim 6 which includes valves in said tubes to shut off the flow and trap liquid in said chamber, a bleeder valve mounted at the top of said chamber and a calibration valve mounted at the bottom of said chamber, said bleeder valve opening to the atmosphere, a hose attached to said calibration valve whereby liquid flows into said hose to a level corresponding to the tank level when said tank valves are closed and said bleeder valve and calibration valve are opened to provide a visual check against said instrument reading.

8. A liquid level indicating apparatus comprising a tank having extra thick side walls, a liquid in said tank at a relatively high temperature and under heavy pressure, said tank having openings through said side walls above and below the normal liquid level range in said tank, a liquid level chamber located externally of said tank comprising, a vertical pipe and T's at the upper and lower ends thereof, horizontal pipe sections attached to said tank in alignment with said openings, tank shut off valves attached to the end of said pipe sections, unions in line with said valves, nipples connecting said valves to said unions, and said unions to said T's, a bleeder valve in line with said upper T, a calibration valve in line with said lower T, nipples connecting said last named valves and said T's, a detector mounted to said upper T and projecting over said T so that it is in alignment with said vertical pipe, a threaded boss at the bottom of said lower T, an opening through said boss and T, a hollow nut engaging said boss, a calibration stem extending through said boss and extending upwardly into said vertical pipe, a radiation source on said calibration stem, a resilient ring between said boss, nut, and stem adapted, when said nut is advanced to tighten against said stem and secure same in an adjustable position as determined by the density of the liquid; a hose attached to said calibration valve whereby the liquid level may be checked by opening said calibration valve and bleeder valve after closing said tank valves.

References Cited in the file of this patent

UNITED STATES PATENTS

| Number | Name | Date |
| --- | --- | --- |
| 978,983 | Brent | Dec. 20, 1910 |
| 1,955,315 | Styer | Apr. 17, 1934 |
| 2,323,128 | Hare | June 29, 1943 |
| 2,456,233 | Wolf | Dec. 14, 1948 |